United States Patent
Brothers et al.

(10) Patent No.: US 9,606,622 B1
(45) Date of Patent: Mar. 28, 2017

(54) GAZE-BASED MODIFICATION TO CONTENT PRESENTATION

(71) Applicant: Audible, Inc., Newark, NJ (US)

(72) Inventors: Nathan Garret Brothers, New York, NY (US); Timothy Jaeger, Metuchen, NJ (US); Shiranchal Taneja, Sammammish, WA (US); Guy Ashley Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 273 days.

(21) Appl. No.: 14/316,692

(22) Filed: Jun. 26, 2014

(51) Int. Cl.
  *G06F 3/00* (2006.01)
  *G06F 3/01* (2006.01)

(52) U.S. Cl.
  CPC .................................. *G06F 3/013* (2013.01)

(58) Field of Classification Search
  CPC .......... G10L 13/08; G10L 13/00; G06F 3/013
  See application file for complete search history.

(56) References Cited

U.S. PATENT DOCUMENTS

| | | | | |
|---|---|---|---|---|
| 6,195,640 B1* | 2/2001 | Mullaly | ................... | G06F 3/013 345/156 |
| 2009/0256959 A1* | 10/2009 | Kondo | ............... | H04N 5/44513 348/468 |
| 2013/0259312 A1* | 10/2013 | Lyons | ................ | H04N 21/4223 382/103 |
| 2013/0268826 A1* | 10/2013 | Nowakowski | ...... | G06F 17/2288 715/203 |
| 2014/0019136 A1* | 1/2014 | Tanaka | .................... | G06F 3/013 704/260 |

* cited by examiner

*Primary Examiner* — Alexander Eisen
*Assistant Examiner* — Abhishek Sarma
(74) *Attorney, Agent, or Firm* — Knobbe, Martens, Olson & Bear, LLP (57) ABSTRACT

Features are disclosed for facilitating content presentation and consumption based on input regarding a user's gaze. Gaze tracking or eye tracking information can be obtained from, e.g., a user-facing camera. A content presentation system can determine whether the user's eyes have closed and how long they have closed, whether the user's gaze is directed at the portion of content currently being presented or at some other location, etc. Based on such determinations, presentation of content may be modified. In some cases, a current presentation position may be changed, highlights may be applied, a special bookmark may be generated, etc.

23 Claims, 9 Drawing Sheets

GAZE-BASED MODIFICATION TO CONTENT PRESENTATION

BACKGROUND

Computing devices, including personal and mobile devices, may be used to read books and other textual content, listen to audio books and other aural content, and watch movies and other video content. Users may load content onto the devices or access network-based content. In some cases, a user may use a single computing device to consume content in two different formats simultaneously. For example, a book may be presented in text format as an electronic book ("e-book") that includes text and/or pictures. The same book may also be presented in audio format as an audio book that includes narration of the text. The presentation of the audio may be synchronized with the presentation of the text by highlighting the text corresponding to the word or phrase currently being spoken in the audio book, automatically scrolling or advancing to the next page of the e-book as the audio book narration continues past the currently displayed text, etc.

Content presentation systems can automatically store information about the presentation position that a user has reached within the content (e.g., page number or other indicator of position within text, elapsed time or other indicator of position within audio, etc.). The automatic storage of presentation position information allows users to resume content consumption at a later time without requiring manual navigation to the place in the e-book or audio book at which the user last stopped consuming the content. Some content presentation positions allow users to manually set "bookmarks" or initiate other such operations. When a user sets a bookmark at a particular position, the content presentation system can store information about the presentation position at which the user set the bookmark. Users can then return to the bookmarked position at a later time.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 1 is a block diagram of an illustrative user computing device that includes various modules and components for managing user interactions with content, storing sleep bookmarks, and the like.

DETAILED DESCRIPTION

Introduction

The present disclosure relates to a content presentation system that monitors a user's gaze and/or other information about the user during content presentation, and performs various presentation-related actions based on aspects of the user's gaze and/or other information. By monitoring the user's gaze, certain content presentation and consumption features can be performed more efficiently than in systems that require typing, mouse input, button activation, touch screen interaction, voice commands, and the like. In addition, gaze monitoring can facilitate certain automatic operations, such as operations performed when a user falls asleep or stops actively consuming the content for a period of time, which would not otherwise be possible with conventional content presentation systems.

Some conventional content presentation systems present audio content, or audio content synchronized with visual versions of the content or other related visual content. For example, a book may be available in both audio book and electronic book ("e-book") formats, and a user may consume both formats simultaneously in a synchronized manner (e.g., the audio may be synchronized with the presentation of the text by highlighting the text corresponding to the word or phrase currently being spoken in the audio book, automatically scrolling or advancing to the next page of the e-book as the audio book narration continues past the currently displayed text, etc.). However, when a user falls asleep, the presentation of the content may continue. This continuing content presentation may waste resources such as battery power, and may even wake the user due to the continued playback of audio content. To reduce such effects, some systems allow a user to set a "sleep timer" that will automatically stop content presentation after a predetermined period of time. However, a sleep timer may still cause the user to lose the user's current position within the content. For example, the user may set the sleep timer for 30 minutes and then fall asleep within 5 minutes. When the user subsequently wishes to resume content consumption (e.g., the next evening), the user may have a difficult time finding the position within the content at which the user fell asleep because the system was unable to determine that the user fell asleep and continued to present content well after the user fell asleep.

Some aspects of the present disclosure relate to creating content location information, such as a special bookmark, to save a user's position within an automatically-progressing content item when a content presentation system determines that the user has fallen asleep or is otherwise not consuming the content that is being presented. The content location information may be referred to as a "sleep bookmark." The automatically-progressing content item may be or include any content item that, once presentation is initiated, progresses in a chronological manner without further user interaction until the end or some other location within the content item is reached, until presentation is interrupted by the user or some automatic process, or until the occurrence of some other event. For example, the automatically-progressing content item may be a media content item (e.g., audio book, musical recording, video, video game, etc.), textual content item (e.g., auto-scrolling text, e-book with automatic page turn functionality, etc.), some combination thereof, etc. A user device that includes a user-facing camera can monitor the state of the user's eyes while an automatically-progressing content item is being presented to the user. If the eye monitoring indicates that the user's eyes have closed, or otherwise indicates that the user's gaze is no longer able to be monitored, then the system may record the presentation position that corresponds to the time the user's eyes were closed. In addition, the system may start a timer. After a predetermined or dynamically determined period of time, if the user's eyes have not opened, the content presentation system may determine that the user has fallen asleep. In some embodiments, information from other sensors, such as heart rate monitors, accelerometers, and the like can be used in addition to camera input to determine whether the user has fallen asleep. When the system determines that the user has likely fallen asleep, the system can automatically create a sleep bookmark. The sleep bookmark can include or reference the presentation position that corresponds to the time at which the user's eyes were first determined to be closed, or some time shortly before or after the time at which the user's eyes were first determined to be closed. In this way, a user can subsequently use the sleep bookmark to resume content consumption from the point at which the user fell asleep, even if content presentation continued for some time thereafter As used herein, the phrase "presentation position" may refer to any information that reflects a spatial position or location within a textual content item (e.g., an e-book), a temporal position or location within a media content item (e.g., an audio book, musical recording, or video), a position or location within some other content item, or any measurement of an amount of content consumed by a user or an amount of content remaining to be consumed. For example, a presentation position of an audio book may be indicated by a timestamp, a counter, a chapter, a last spoken word, etc., or any combination thereof. A presentation position of an electronic book may be indicated by a page number, embedded position indicator, last word highlighted or made visible on the display, etc. In some embodiments, a presentation position may be reflected as a percentage (e.g., a point representing 25% of the content has been consumed). In other embodiments, a presentation position may be reflected as an absolute value (e.g., 2 hours, 30 minutes and 5 seconds into an audio book or 13,595 words into an electronic book). A presentation position may be reflected by any combination of the above information, or any additional information that indicates the current consumption or playback position within a content item. In some embodiments, data regarding a current or most recent presentation representation position may reflect the position at which a device last stopped presenting content. One example of a system for maintaining presentation positions is disclosed in U.S. patent application Ser. No. 12/273,473, filed on Nov. 18, 2008 and titled "Synchronization of Digital Content," the contents of which are hereby incorporated by reference.

Additional aspects of the present disclosure relate to adjusting presentation of an automatically-progressing version of a content item, such as an audio book, based on where a user's gaze falls on a display of a textual version of the same content item, such as an e-book. For example, if the current presentation position of the audio book corresponds to the first paragraph on a page, and the user looks down at the fourth paragraph for a period of time (or the user's eye movements indicate that the user is reading in the fourth paragraph), then the current presentation position of the audio book can be moved ahead to correspond to the fourth paragraph. In this way, the user can adjust the presentation position of the audio book without being required to physically activate an input component (e.g., a mouse, keyboard, button, touch screen, etc.), without being required to speak a voice command, etc. Rather, the presentation of the audio book can be adjusted by simply reading the content that the user wishes to hear.

Further aspects of the present disclosure relate to improving content presentation by performing various actions based on a user's gaze. For example, text corresponding to currently narrated audio may not be highlighted or otherwise visually indicated to the user during simultaneous presentation of audio book and e-book versions of the same book. As a result, a user may not be able to quickly return to the proper location of the e-book if the user looks away from the e-book display. The content presentation system can detect that the user's gaze has deviated from the portion of text that corresponds to the current presentation position of the audio book (e.g., the gaze has deviated by more than a threshold amount, is directed away from the display screen altogether, etc.). When the user looks back at the display, highlights (or some other visual effect) may be temporarily displayed to indicate the text that corresponds to the current presentation position of the audio book. In some embodiments, a user may interact with the content items or with a user device in general through the use of certain gaze locations, patterns, and the like. For example, the user may look at a particular portion of a display (e.g., the bottom right or bottom left corner) in order to advance the display of an e-book to the next page or return to the previous page, respectively. As another example, the user may look at a particular word for a period of time exceeding a threshold in order to obtain a definition of the word, either visually or audibly.

Although aspects of the embodiments described in the disclosure will focus, for the purpose of illustration, on content presentation and consumption features with respect to audio books and e-books, one skilled in the art will appreciate that the techniques disclosed herein may be applied to any number of processes or applications. For example, the features may be used with a wide range of media content and other electronic content, including: textual content other than e-books, such as articles and emails; audio content other than audio books, such as music, mobile broadcasts ("podcasts"), and the like; audio/visual content such as movies, televisions shows, and other videos; etc. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

Example User Device and Content Presentation Management System

Figure 1:
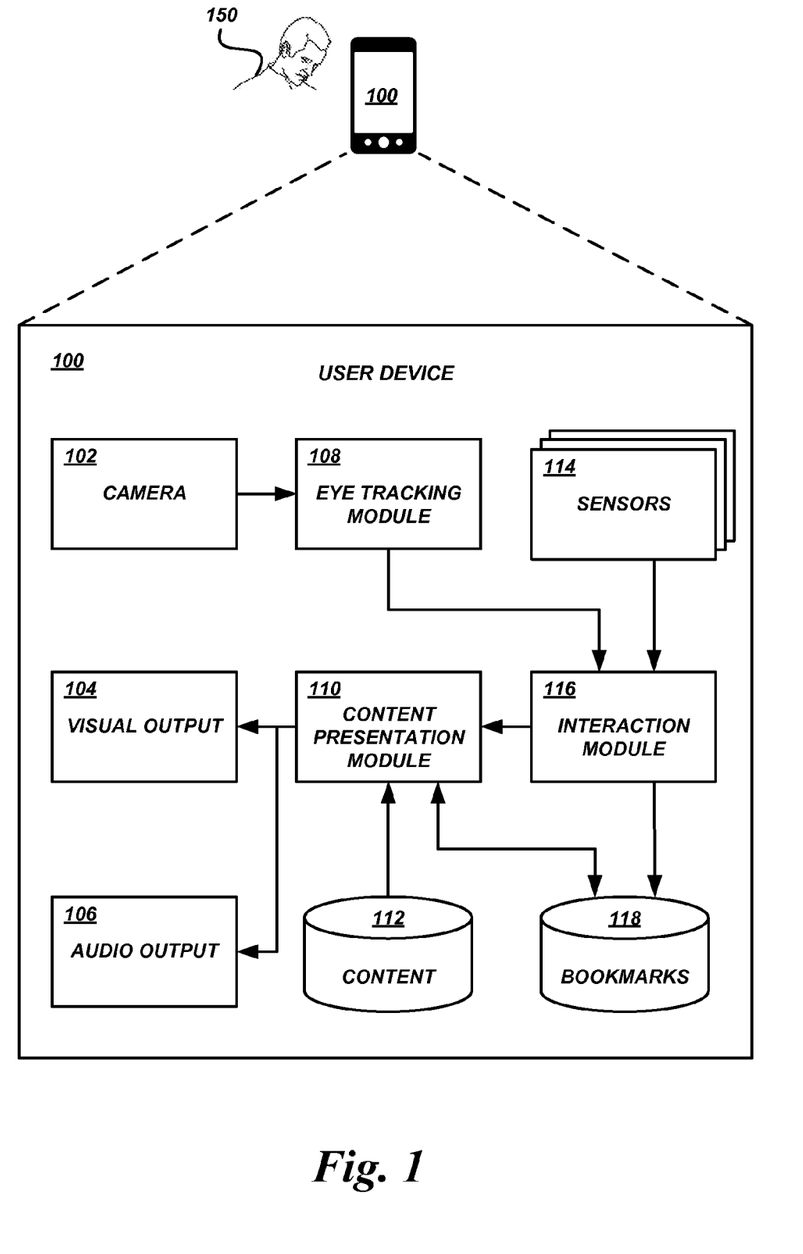

FIG. 1 shows an illustrative user device 100 with various modules and components that may implement some or all of the features described in the present disclosure. The user device 100 may be a mobile device that includes one or more processors and a memory which may contain software applications executed by the processors. For example, the user device 100 may be a personal computing device, terminal computing device, laptop computing device, tablet computing device, electronic reader device, mobile device (e.g., mobile phone, media player, handheld gaming device, etc.), wearable device with network access and program execution capabilities (e.g., "smart watch" or "smart eyewear"), wireless device, set-top box, gaming console, entertainment system, television with network access and program execution capabilities (e.g., "smart TV"), or various other electronic devices and appliances.

The user device 100 may include various input and/or output components to, e.g., present content to users and obtain information regarding user interactions with the presented content or user device 100. In some embodiments, as shown, the user device 100 may include a camera 102 to capture images of a user's eyes so that the user device 100 can perform eye tracking, a visual output component 104 such as a video display to present visual content to the user 150, including text, images, video, and the like, and an audio output component 106 such as a speaker to present audio content to a user 150, including audio books, music, and the like.

A content presentation module 110 can obtain locally available content from a content data store 112 on the user device 100, and present the content using the visual output component 104 and/or audio output component 106. In some embodiments, the content presentation module 110 may present content from a separate input component, such as an optical drive, or from a network source, such as streaming video web site. The content presentation module 110 may present individual content items, such as individual e-books or audio books, or the content presentation module 110 may provide synchronized presentation of multiple versions of a content item, such as book in both e-book and audio book formats as described above.

The user device 100 may include or be in communication with various sensors 114 that provide the user device 100 with additional information about the user 150 and interaction with the content being presented or the user device 100 generally. For example, the user device 100 may include an accelerometer, global positioning system ("GPS") antenna, and/or some other sensor 114. As another example, the user device 100 may be in contact with a heart rate monitor or accelerometer worn by the user 150 of the user device 100. The user device 100 can use input information from the camera 102 and/or sensors 114 to determine whether to take some action related to presentation of a content item or operation of the user device 100, as described in greater detail below.

The user device 100 may include an eye tracking module 108 that receives input from the camera 102 and determines whether a user's gaze is detectable, where the user's gaze is currently directed, etc. An interaction module 116 may receive information from the eye tracking module 108, sensors 114, and/or other input data providers to determine the manner in which a user 150 is interacting with the content or otherwise with user device 100. For example, the interaction module 116 can use information regarding the current direction or target of the user's gaze to determine whether the user 150 is following along with the text of an e-book during presentation of an audio book version of the same content, or whether the user's gaze has deviated from the text corresponding to the presentation position of the audio book. Based on this determination, the interaction module 116 can provide notifications or data to the content presentation module 110, generate special bookmarks, or otherwise cause the content presentation module 110 to adjust content presentation characteristics, such as the application of highlighting, changing the presentation position, and the like.

Generating Sleep Bookmarks

Figure 2:
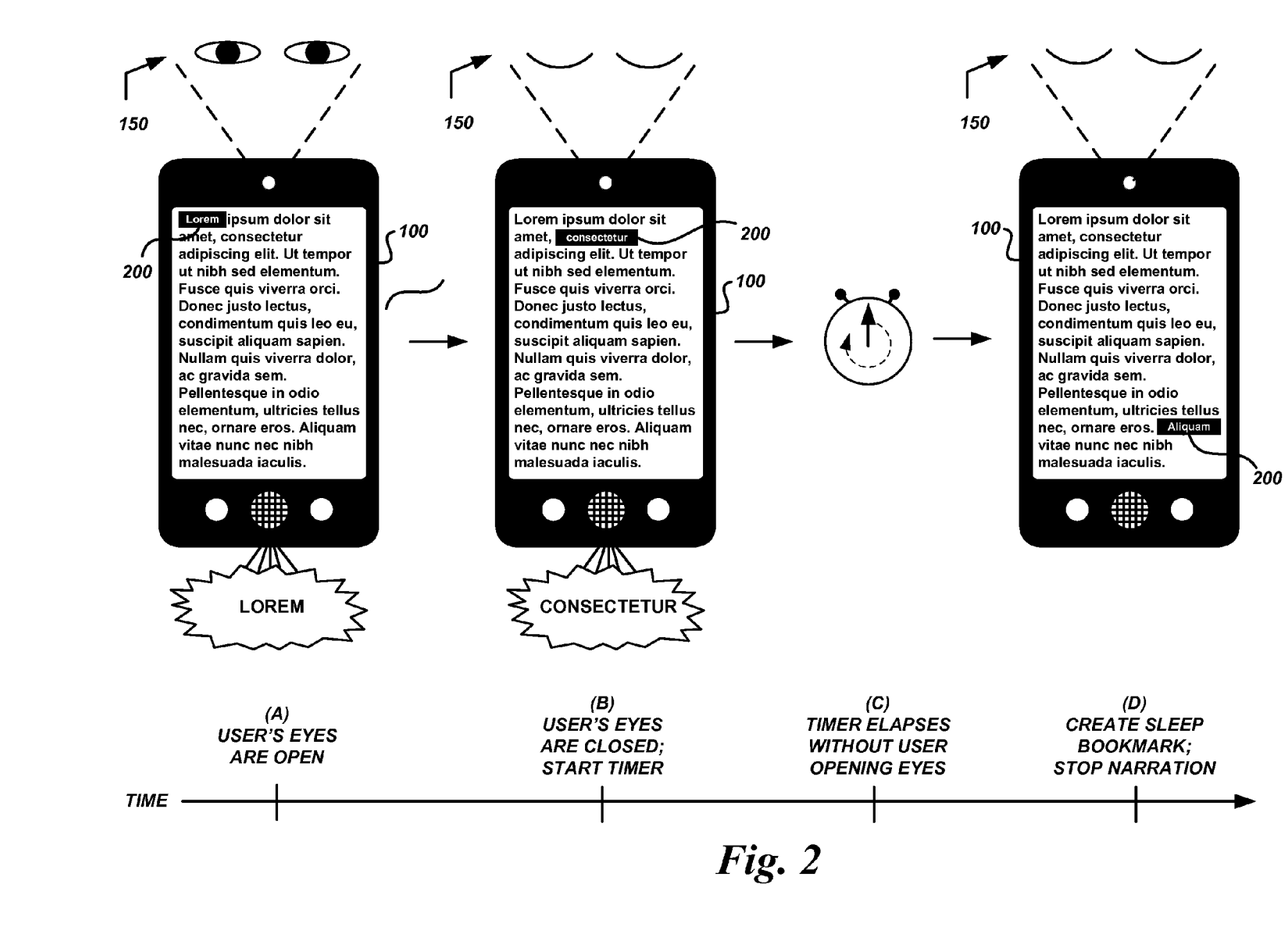
FIG. 2 is a diagram of illustrative events that may trigger creation of a sleep bookmark according to some embodiments.
Figure 3:
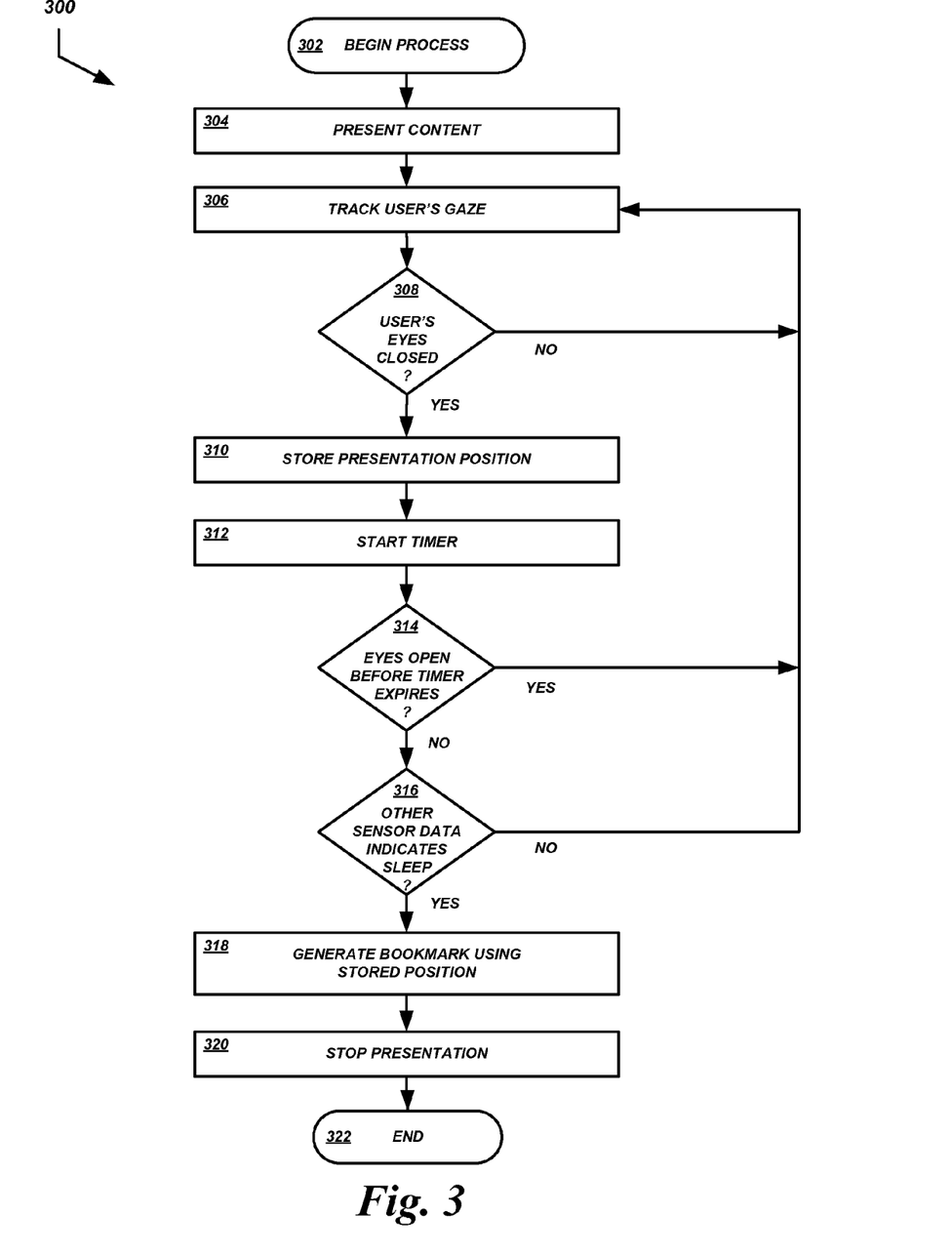
FIG. 3 is a flow diagram of an illustrative process for creating a sleep bookmark according to some embodiments.

FIGS. 2 and 3 are diagrams of illustrative interactions between a user 150 and a user device 100, and a process 300 that may be performed by the user device 100 during presentation of automatically-progressing content. Advantageously, an eye tracking module 108, interaction module 110 or some other module or component of the user device 100 may track a user's gaze during content presentation and create content location information, such as a sleep bookmark, upon determining that the user 150 has fallen asleep or otherwise determining that the user is no longer following presentation of the content.

The process 300 shown in FIG. 3 begins at block 302. The process 300 may be embodied in a set of executable program instructions stored on one or more non-transitory computer-readable media, such as one or more disk drives or solid-state memory devices, of the user device 100 or of some other computing device with which the user device 100 communicates. When the process 300 is initiated, the executable program instructions can be loaded into memory, such as RAM, and executed by a hardware processor (e.g., a central processing unit or "CPU") of the user device 100. In some embodiments, the user device 100 may include multiple (e.g., two or more) processors, and the process 300 or portions thereof may be executed by the multiple processors serially or in parallel.

At block 304, the content presentation module 100 or some other module or component of the user device 100 may present automatically-progressing content to the user 150. The content may include audio and/or visual portions, or may be two different items (or different versions of an item) presented simultaneously, such as an e-book and a corresponding audio book. As shown in FIG. 2, the text of the e-book portion may be presented on a display of the user device 100, and the audio book may be presented by a speaker of the user device 100. The current presentation position of the audio book may be synchronized or substantially synchronized with the presentation position of the e-book. For example, the words that are currently being presented via narration of the audio book may be highlighted 200 in the text.

At block 306, the eye tracking module 108 or some other module or component of the user device 100 may track the gaze of the user 150 or otherwise track the state of the user's eyes during presentation of the content. As shown in FIG. 2, the user's eyes may be open during presentation of the content at time (A). The eye tracking module 108 may receive input from the user-facing camera 102 of the user device 100, identify the portion of the input that most likely corresponds to an image of eyes, and track whether the user's eyes are open or closed, where the user's gaze is targeted, etc.

At decision block 308, the eye tracking module 108 or some other module or component of the user device 100 may determine whether the user's eyes have closed, whether the user's gaze is no longer able to be tracked, or otherwise whether the user is no longer actively consuming content. For example, input from the camera 102 may be analyzed by the eye tracking module 108, as described above. The eye tracking module 108 can determine whether a portion of the input likely corresponds to an image of closed eyes, or the eye tracking module 108 can determine whether or not the camera 102 input includes some portion that corresponds to an image of open eyes. If there is a portion of the image that corresponds to closed eyes or no portion that corresponds to open eyes, then the eye tracking module 108 may trigger detection of the user's eyes being closed. In some embodiments, the head position of the user 150 may be tracked using input from the user-facing camera 102 instead of, or in addition to, tracking the user's eyes. Information about the user's head position or orientation with respect to the user device 100 may provide an additional or alternative indication of whether the user is sleeping or otherwise not following presentation of the content item.

As shown in FIG. 2, the user's eyes have closed at time (B), and the eye tracking module 108 may trigger detection of the user's eyes being closed, also referred to herein as a "closed eyes" detection. The eye tracking module 108 may provide a notification or other information to the interaction module 116 reflecting the determination that the user's eyes are closed. In some embodiments, the eye tracking module 108 may wait for some predetermined or dynamically determined period of time before triggering a "closed eyes" detection. In this way, the eye tracking module 108 can avoid raising false positives each time the user 150 blinks. In other embodiments, a "closed eyes" detection may be triggered each time the eye tracking module 108 determines that the user's eyes are closed, including when the user 150 blinks. The interaction module 116 or some other module or component may then make the determination of whether the user 150 has fallen asleep, as described in greater detail below, each time a "closed eyes" detection is triggered. The eye tracking module 108, interaction module 116, and/or various other modules may be combined into a single module that performs all of the functions described above, or the distribution of functions between two or more separate modules may be different than described above.

If a "closed eyes" detection (or some other determination that the user is not following content, such as a detection that the user's head position indicates the user is no longer actively consuming the content) has not been triggered, the eye tracking module 108 may continue to monitor the user's eyes at block 306. However, if a "closed eyes" detection (or some similar determination) has been triggered, the process 300 can proceed to block 310, where the current presentation position (or information regarding the current presentation position) is stored. For example, the interaction module 116 or some other module or component can store the current elapsed time in the audio book that is being presented, an index of the current word in the e-book, or some other information. Storing the current presentation position, even temporarily in RAM, may be important if the user device 100 later determines that the user 150 has fallen asleep. In that case, the stored presentation position can be used to generate a special sleep bookmark that the user can access at a later time.

At block 312, the interaction module 116 or some other module or component can start a timer or otherwise begin tracking a predetermined or dynamically determined amount of time or content presentation. The timer may be used to ensure that the user 150 has fallen asleep, and not just blinked, temporarily closed his/her eyes, briefly looked away from the user device 100, or made some other movement not indicative of sleep but which otherwise caused a "closed eyes" detection to be triggered. For example, the timer may be standard amount of time such as 1 minute, 5 minutes, 10 minutes, etc. As another example, the timer may be dynamic or customized, based on an analysis of previous user interactions, configurable by the user, etc.

At decision block 314, the interaction module 116 or some other module or component can determine whether the user's eyes have opened or a view of the user's open eyes have otherwise been reestablished before the timer expires. If a view of the user's open eyes has been reestablished, the eye tracking module 108 may resume tracking as described above. As shown in FIG. 2, a timer that was started at or after time (B) may elapse at time (C) without the user's eyes opening. In such cases, when the user's eyes have not opened or a view of the user's open eyes has not otherwise been reestablished, then the process 300 may proceed to decision block 316.

At decision block 316, the interaction module 116 or some other module or component can determine whether input from one or more other sensors 114 indicates that the user is sleeping or is otherwise not following presentation of the content. The sensors may provide information reflecting various activities and/or characteristics of the user 150. The use of sensor data from other sensors 114 can help avoid false determinations that the user is sleeping when, e.g., the user has merely oriented the device 100 or the user's head such that a clear view of the user's eyes cannot be established, the user 150 has set the device 100 down and continued listening to the audio content without following along with the text (if any), etc. For example, the sensors 114 may include microphones, heart rate monitors, accelerometers, and the like. Data form such sensors 114 (e.g., breathing patterns and/or heart rates indicative of an awake state, accelerometer readings corresponding to movements indicative of an awake state, etc.) may be used to determine that the user 150 is indeed awake. However, if the data from the sensors confirms that the user is asleep (e.g., heart rate is consistent with the user's sleeping heart rate, accelerometer readings are indicative of normal sleep movements, etc.), the process 300 can proceed to bock 318. In some embodiments, the data from additional sensors 114 is the exclusive or primary data used to determine whether the user is following presentation of content (e.g., no "closed eyes" detection is triggered; instead, a determination of whether a user is following presentation of content is a holistic determination based on some combination of sensors data to detect a signature or fingerprint of active content consumption or a lack thereof). In further embodiments, no additional sensors 114 are present or used, or data from additional sensors 114 is not otherwise used to confirm a determination, made based on eye tracking, that the user 150 has fallen asleep (e.g., a "closed eyes" detection is the sole method of determining whether a user is following presentation of content).

At block 318, the interaction module 116 or some other module or component can generate a bookmark indicating the presentation position at the time the user fell asleep. Such a bookmark may be referred to as a "sleep bookmark." Generally described, a conventional bookmark may be or include information indicating a particular presentation position within a content item (or multiple content items). The bookmark may be stored in a bookmark data store 118. Conventional bookmarks are typically created by users or content providers to indicate presentation positions of interest, chapter boundaries, and the like. Some presentation positions are automatically generated by content presentation systems, such as "farthest position reached" bookmarks that allow users to pick up from the presentation position at which they last left off. In contrast, a sleep bookmark is a special type of bookmark that can automatically be created by the interaction module 116 based on a determination that the current user 150 is asleep or that the user 150 is otherwise no longer actively consuming the content being presented. The sleep bookmark can be retroactively set to the presentation position at which the user's eyes were first determined to be closed, at which the user was determined to be asleep, or some other relevant time. In some embodiments, rather than using a presentation position that was stored upon detecting that the user's eyes have closed, as described above with respect to block 310, the sleep bookmark can be dynamically calculated by subtracting the time used for the timer in block 312 from the current presentation position at the time the sleep bookmark is set, such as at time (D) in FIG. 2. For example, if the user is listening to presentation of an audiobook at a faster-than-normal narration speed (e.g., 1.5× or 2× normal speed), the time subtracted from the reference position (e.g., the current presentation position when the process 300 reaches block 318) can be scaled accordingly so that the proper presentation position at the time the user stopped actively consuming content can be determined and stored in the sleep bookmark. In some embodiments, additional information may be included or otherwise associated with a sleep bookmark, such as contextual information regarding a user's movements or actions (e.g., as determined using sensor 114 input) before or at the time the user's eyes closed or the user fell asleep. In this way, a user 150 can be provided with contextual information regarding the automatically generated sleep bookmark so that the user 150 can determine why the bookmark was generated.

At block 320, the content presentation module 110 can stop presentation of the content item (e.g., stop audible playback of the audio content) after determining that the user 150 has fallen asleep. In some embodiments, presentation of the audio content may continue for some predetermined or dynamically determined period of time after the user 150 has fallen asleep. For example, some users prefer to have audio content presented even after they have fallen asleep, otherwise the sudden stoppage of content may jar them awake. The amount of time may be user-configurable, or may be dynamically determined based on data from additional sensors 114 indicating that the user 150 entered a particular stage of sleep in which the user 150 is less likely to be awoken by a sudden stoppage of content presentation. In some embodiments, the audio volume may be adjusted downward over some period of time to avoid waking a user 150 due to a sudden stoppage of content presentation.

In some embodiments, a prompt or message may be presented to the user prior to stopping presentation of content, or to aid in determining whether the user is asleep or otherwise not actively following presentation of the content. For example, in response to a "closed eyes" detection, a visual prompt may be displayed to the user to determine whether the user is actively following presentation of the content. The user may activate a button or otherwise provide some indication that the user is actively consuming content, and no sleep bookmark will be created (e.g., the process 300 can return to block 306). As another example, a recorded message, tone, or other audible prompt may be provided to the user instead of, or in addition to a visual prompt. As a further example, a vibration or other tactile prompt may be provided to the instead of, or in addition to, a visual prompt.

Figure 4:
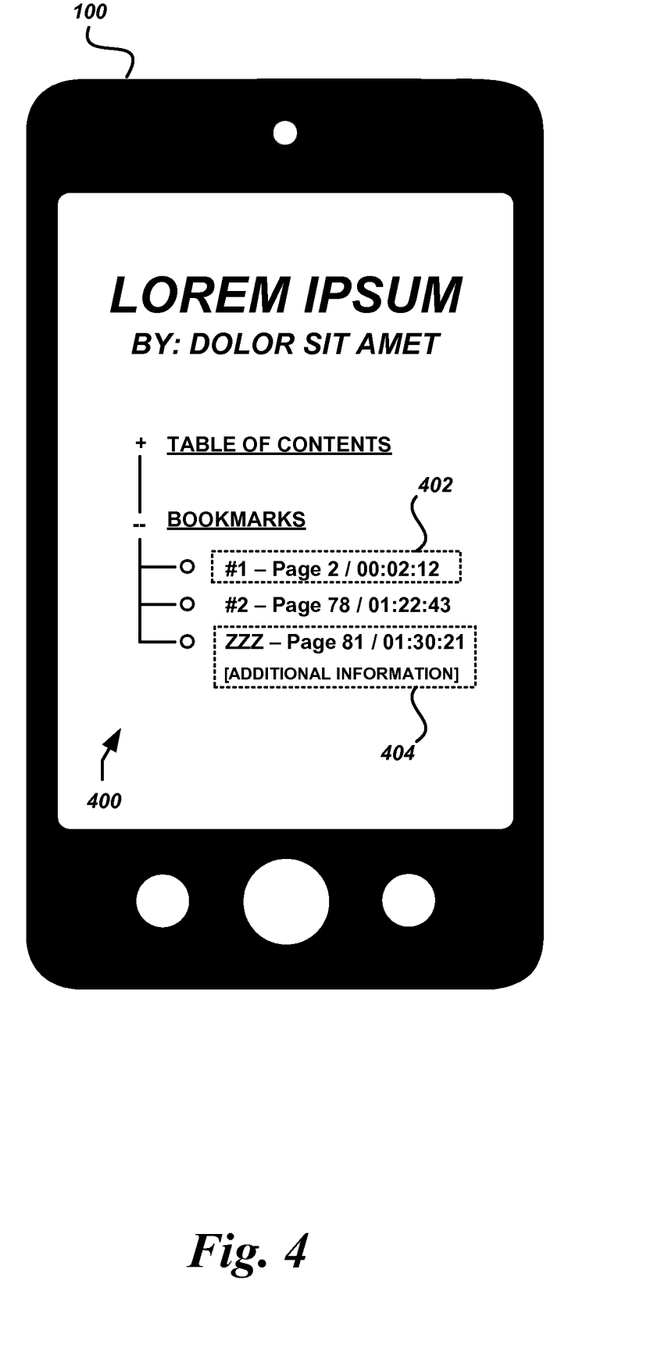
FIG. 4 is a diagram of an illustrative user interface for selecting bookmarks according to some embodiments.

FIG. 4 shows an illustrative user interface 400 that displays bookmarks for a content item (or group of content items). Sleep bookmarks may be displayed such that they are easily distinguishable from conventional bookmarks, including bookmarks created by users, content providers, and the like. For example, a sleep bookmark 404 may be labeled differently from the conventional bookmarks 402 using a tag (e.g., "ZZZ" or "Sleep") as shown, or the sleep bookmark 404 may be displayed in a different font or color, displayed in a separate location or grouping within the user interface 400, etc. In addition, the sleep bookmark 404 may be displayed with contextual information and other information regarding circumstances under which the sleep bookmark 404 was created (e.g., created after detecting the device 100 being dropped, after detecting a movement corresponding to the user 150 lying down or rolling over, created after a particular chapter title or other content header was passed, etc.). In some embodiments, sleep bookmarks 404 may be presented such that they appear identical or substantially similar to other bookmarks.

Altering Content Presentation

Figure 5A:
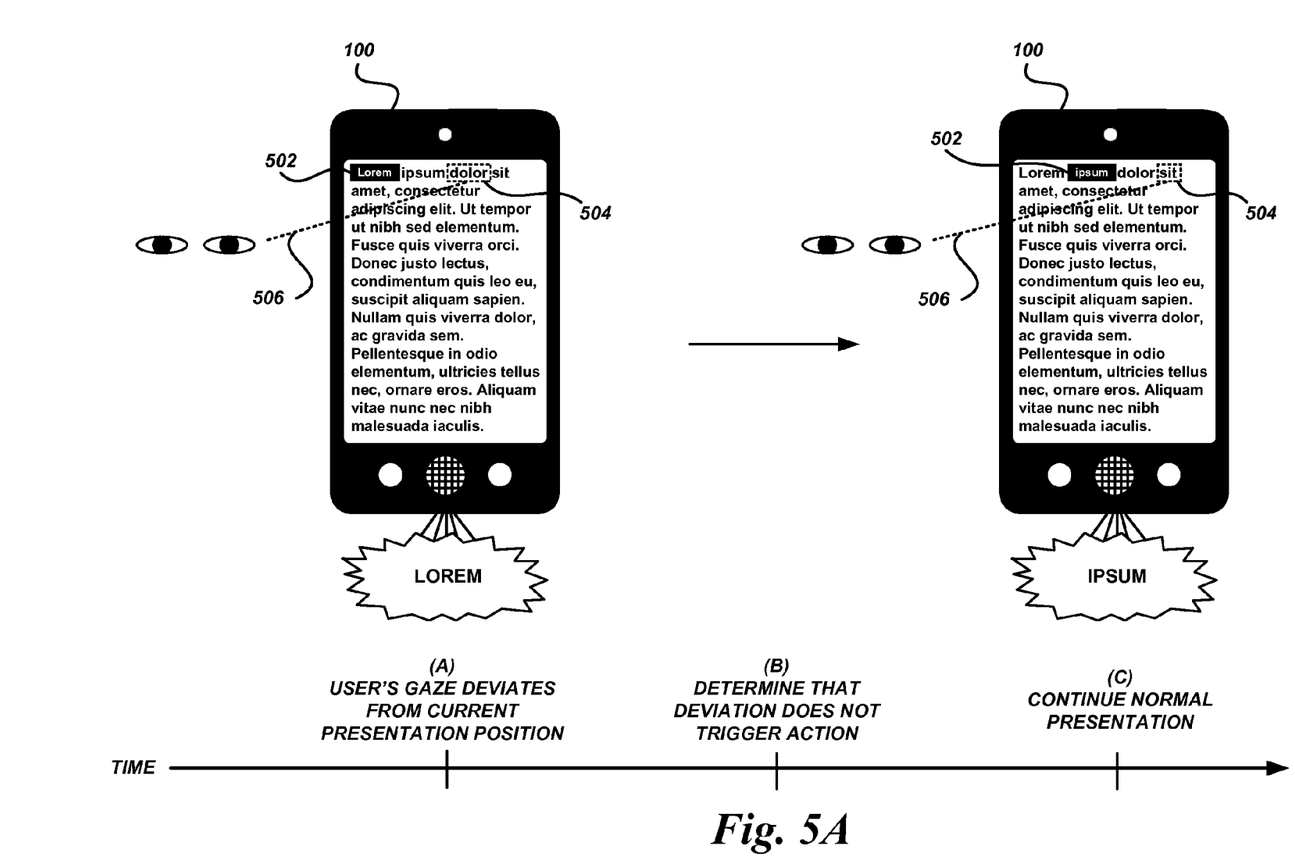
FIGS. 5A-5C are diagrams of illustrative interactions and events that may trigger changes in aspects of content presentation according to some embodiments.
Figure 5B:
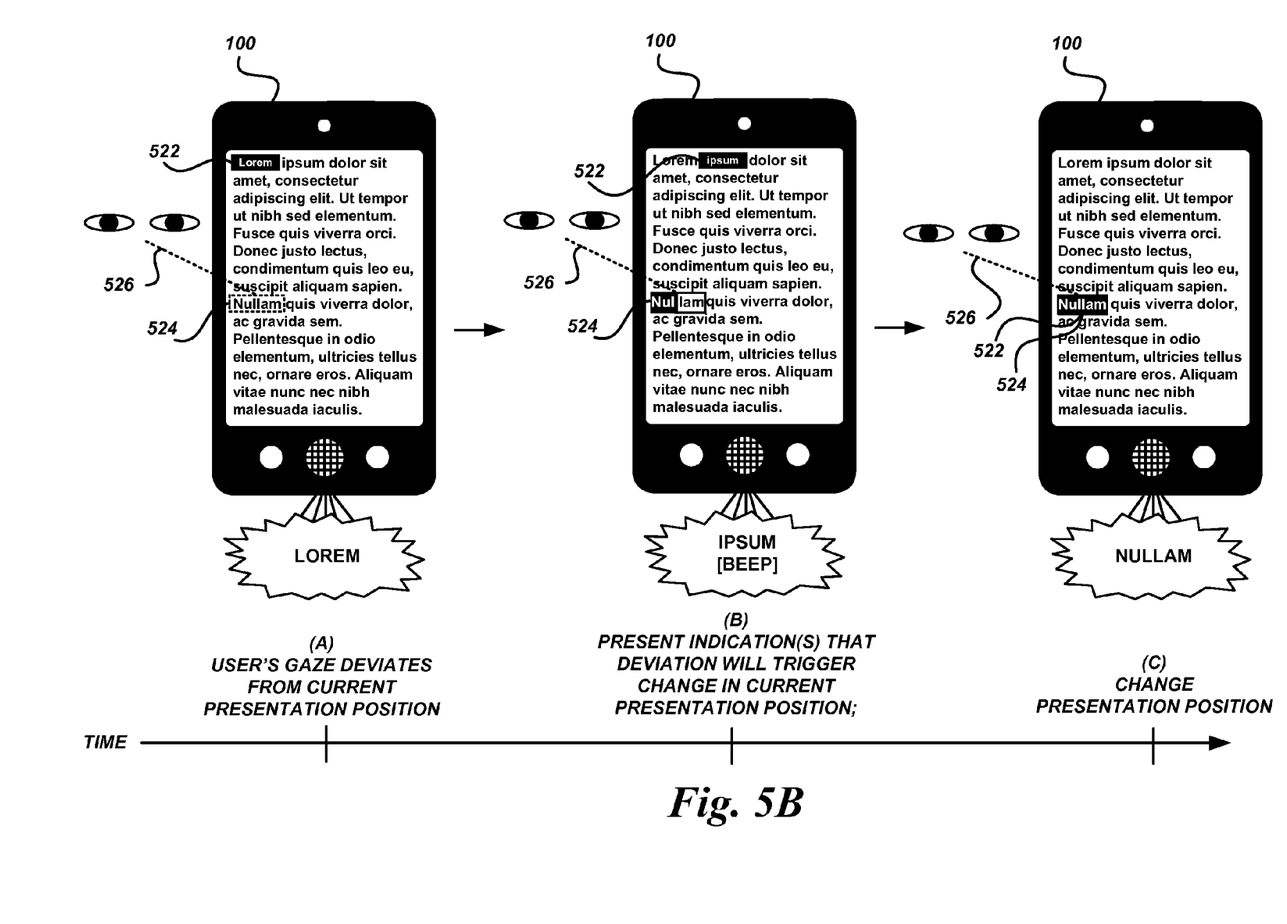
Figure 5C:
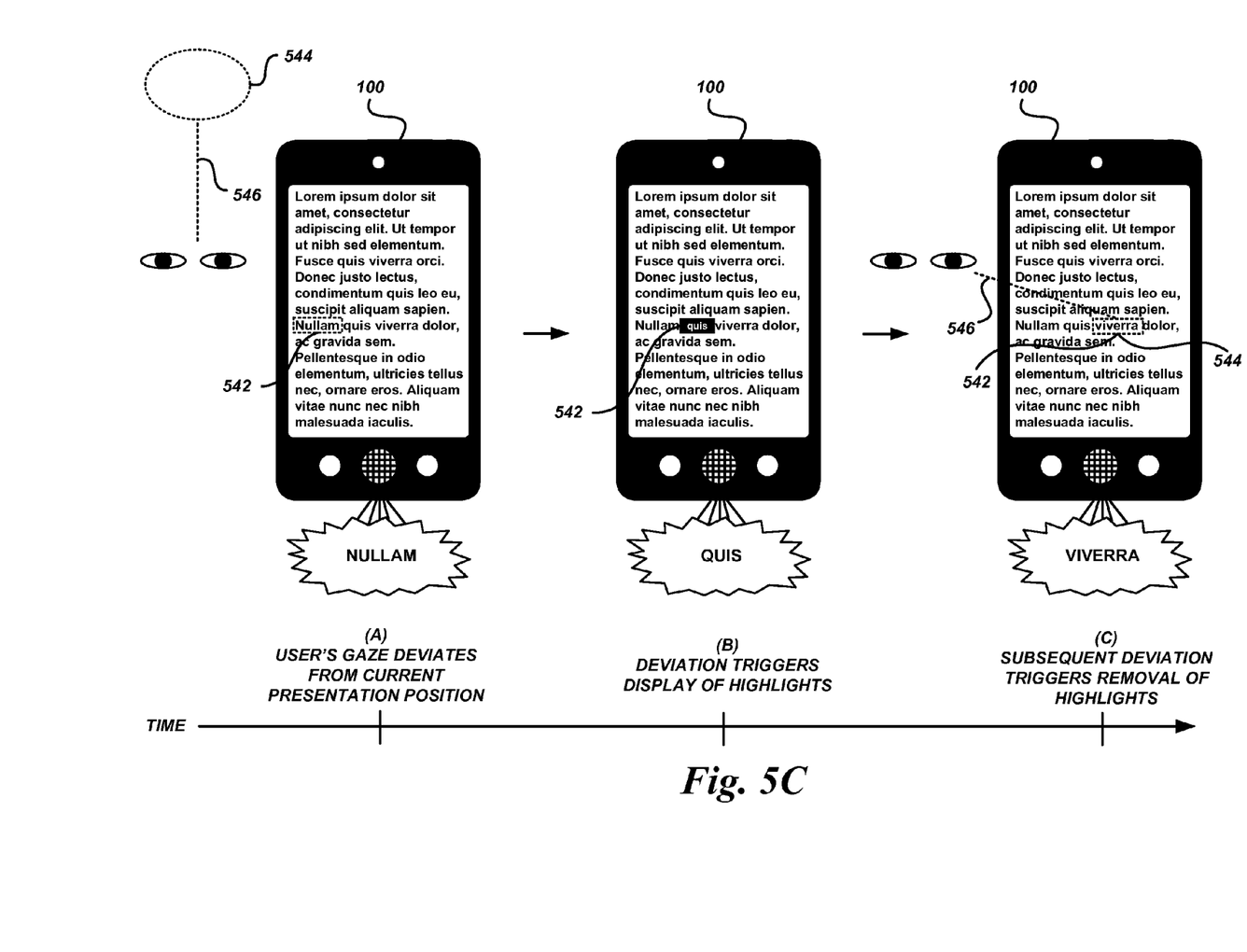
Figure 6:
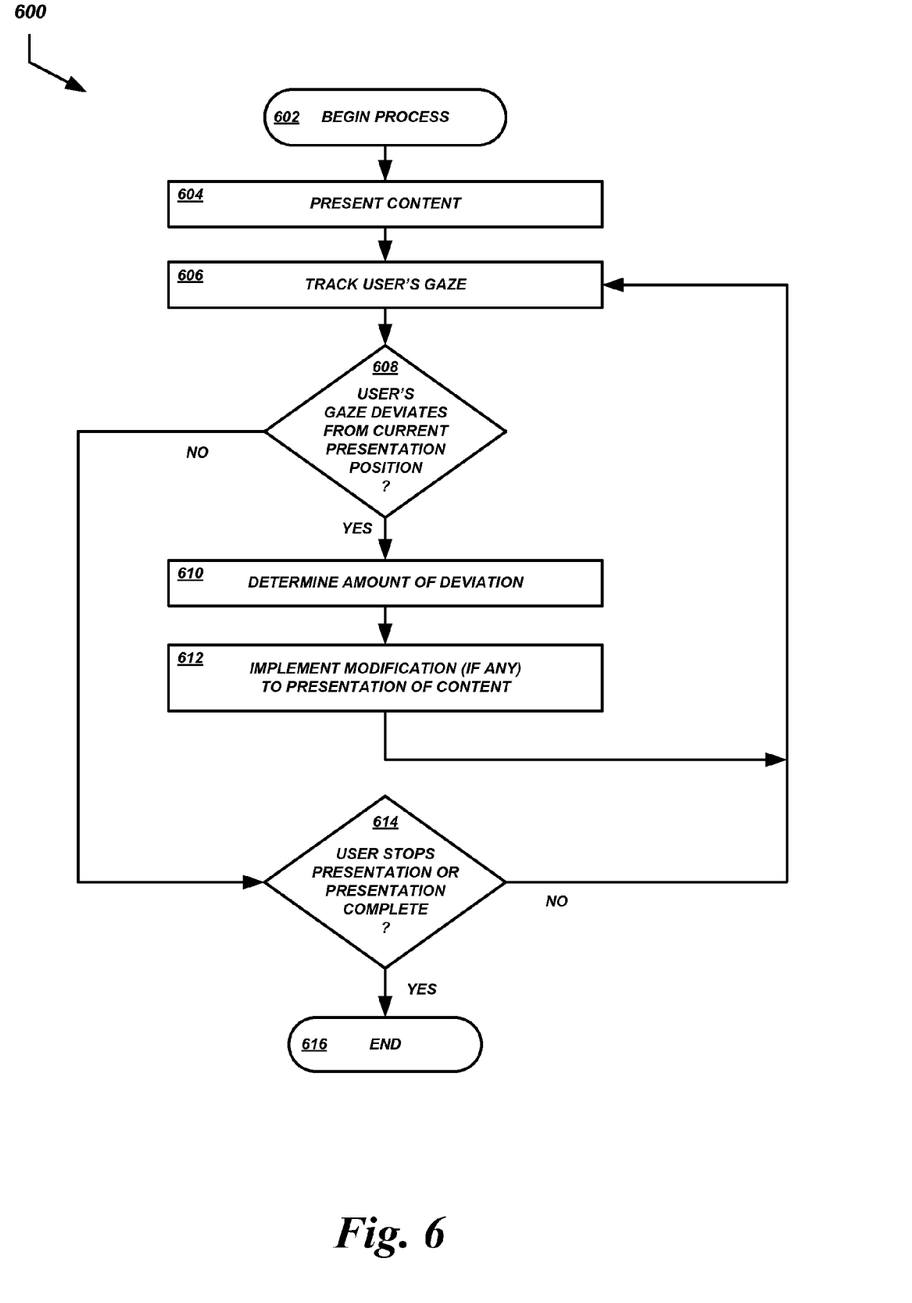
FIG. 6 is a flow diagram of an illustrative process for managing user interactions and changing aspects of content presentation according to some embodiments.

FIGS. 5A, 5B and 5C are diagrams of illustrative interactions between a user 150 and a user device 100 during presentation of an automatically-progressing content item (or items). FIG. 6 is a flow diagram of an illustrative process 600 that may be performed by the user device 100 to alter content presentation based on various interactions, such as those shown in FIGS. 5A-5C. Advantageously, an eye tracking module 108, interaction module 110 or some other module or component of the user device 100 may track a user's gaze during content presentation, and may modify various aspects or characteristics of content presentation depending upon where the user's gaze is directed. For example, the current presentation position within an audio book can be changed to correspond to the location at which the user is looking in the e-book version of the same book. As another example, highlights may be temporarily displayed in the e-book to indicate the current presentation position in the audio book after the user looks away from the e-book for a period of time. The examples illustrated in the figures and described herein are illustrative only, and are not intended to be limiting. In some embodiments, other modifications may be made to content presentation depending upon where a user's gaze is directed, the extent to which the user's gaze deviates from the current presentation position, etc.

The process 600 shown in FIG. 6 begins at block 602. The process 600 may be embodied in a set of executable program instructions stored on one or more non-transitory computer-readable media, such as one or more disk drives or solid-state memory devices, of the user device 100 or of some other computing device with which the user device 100 communicates. When the process 600 is initiated, the executable program instructions can be loaded into memory, such as RAM, and executed by a hardware processor (e.g., a central processing unit or "CPU") of the user device 100. In some embodiments, the user device 100 may include multiple (e.g., two or more) processors, and the process 600 or portions thereof may be executed by the multiple processors serially or in parallel.

At block 604, the content presentation module 110 or some other module or component of the user device 100 may present content to the user 150 via the visual output 104 and/or audio output 106. The content may include audio and/or visual portions, or may be two different items (or different versions of an item) presented simultaneously, such as an e-book and a corresponding audio book. As shown FIG. 5A, the text of the e-book portion may be presented on a display of the user device 100, and the audio book may be presented by a speaker of the user device 100. The current presentation position of the audio book may be synchronized or substantially synchronized with the presentation position of the e-book. For example, the words that are currently being presented via narration of the audio book may be highlighted 502 in the text of the e-book.

At block 606, the eye tracking module 108 or some other module or component of the user device 100 may track the gaze of the user 150 or otherwise track the state of the user's eyes during presentation of content. As shown in FIG. 5A, the user's gaze 506 may be directed to a fixation point or other target 504 that is just ahead of the current presentation position, indicated by highlighted text 502. FIG. 5B shows the user's gaze 526 directed to a fixation point or other target 524 that is a substantial distance, in either a spatial or temporal sense, from the current presentation position 522.

For example, the distance of the target 524 of the user's gaze 526 from the current presentation position 522 may be measured as a number of inches, millimeters or pixels from the current presentation position 522, a number of letters, words, sentences or paragraphs from the current presentation position 522, a span of time between presentation positions in a related audio content item that correspond to the current presentation position 522 and target 524 of the user's gaze 526, etc. FIG. 5C shows the user's gaze 546 directed to a fixation point or target 544 that is off the display of the user device 100 entirely.

At decision block 608, the eye tracking module 108 or some other module or component can determine whether the user's gaze deviates from the current presentation position. If so, the process 600 can proceed to block 610. As described above, the examples shown in FIGS. 5A-5C all illustrate a gaze directed to a target that deviates from the current presentation position of the content item (e.g., the word or phrase in an e-book that is currently being presented audibly in a corresponding audio book). In some embodiments, the process 600 may proceed to block 610 only if the user's gaze deviates from the current presentation position by an amount exceeding a predetermined or dynamically determined deviation threshold.

At block 610, the eye tracking module 108 or some other module or component can determine the amount with which the target of the user's gaze deviates from the current presentation position. The amount of deviation may be important in systems that implement different modifications to the presentation of content depending upon how far a user's gaze deviates from the current presentation position (e.g., systems using different thresholds, tiers, ranges, etc.). In some embodiments, the amount of deviation may not be determined because, e.g., a single modification to presentation of the content is implemented regardless of the amount of deviation, or different modifications are implemented based on the location of the target of the user's gaze regardless of the amount to which that location deviates from the current presentation position.

At block 612, the content presentation module 110 or some other module or component can implement modifications to the presentation of content. The particular modifications that are implemented may depend upon how far the target of the user's gaze deviates from the current presentation position, as determined above.

As shown in FIG. 5A, the target 504 of the user's gaze 506 is within two words of the current presentation position 502 at time (A). At time (B), the interaction module 116 or some other module or component may determine that the target 504 is within a threshold measurement (e.g., number of words, characters, inches, pixels, etc.) of the current presentation position 502. In this case, no modification may be implemented. At time (C), the user's gaze 506 may continue to be directed to a target 504 that is two words in front of the current presentation position 512, but presentation of the content may proceed without modification. In some embodiments, a modification may be implemented in such cases. For example, the speed of audio presentation may be increased (or reduced, depending upon the where the user's gaze is directed) until the user's gaze is directed to the text that corresponds to the current presentation position of the audio content. Such a modification may be implemented based on a deviation (e.g., number of words, characters, inches, pixels, etc.) of the target 504 from the current presentation position 502 exceeding a first threshold but failing to meet a second threshold that would trigger a different modification, such as the modification described below with respect to FIG. 5B. Various characteristics of the detected deviation may be considered when determining whether to initiate a modification to content presentation, or when determining which of multiple (e.g., two or more) modifications to initiate. For example, a modification determination can be based on whether the deviation is primarily in the horizontal or vertical direction. Relatively small vertical deviations may correspond to much larger textual deviations than a horizontal deviation of the same magnitude (e.g., two inches in the vertical direction may correspond to several sentences, while two inches in the horizontal direction may correspond to only a few words).

As shown in FIG. 5B, the user's gaze 526 may be directed to a target 524 at time (A) that is substantially farther away from the current presentation position 522 than the example shown in FIG. 5A. The interaction module 116 or some other module or component may determine that the deviation of the target 524 from the current presentation position 522 exceeds a threshold number of paragraphs, sentences, words, characters, inches, pixels, or some other measurement, corresponds to a threshold amount of audio content, etc. The deviation may trigger a change in content presentation. However, before a change in content presentation is initiated, a timer may be started so that content presentation does not change each time a user briefly glances away from the current presentation position. For example, the timer may be set to 2 seconds, 1 second, 0.5 seconds, or some other timeframe designed to allow normal deviation from the current content position without any intent on the part of the user to initiate a modification to presentation of the content. The modification to content presentation may be implemented if the timer expires without the user's gaze returning to a target that is within a threshold of the current presentation position. In some embodiments, characteristics of the content may be considered when setting the timer or otherwise when determining whether to initiate a modification to presentation of the content. For example, a visual content item may include text and also an image, illustration, chart, or other figure. Audio content may be simultaneously presented with the visual content item, and the audio content item may include a narration of the text. If the portion of text being narrated is a description of the figure, then the user's glance may be directed to the figure rather than the text being narrated for a period of time that would otherwise trigger a modification in content presentation. The content presentation module 110 or some other module or component may have knowledge of such content characteristics, either from performing an automated analysis of the content or though metadata or other information associated with the content, and may therefore suppress the modification, deviation trigger, etc.

In some embodiments, as shown in FIG. 5B, the content presentation module 110 or some other module or component may cause presentation of an indication that content presentation will be modified soon, at the expiration of a timer, etc. For example, at time (B) a dynamically changing partial highlight may be displayed to the user at the target 524 of the user's gaze 526. The partial highlight may change as time passes to dynamically reflect an amount of time left before the upcoming modification (e.g., a status-bar style highlight may expand from left to right over the target 524 until the target 524 is completely highlighted, a highlight of the target 524 may "fade in" through an increase in contrast or color saturation until the target is completely highlighted, etc.). In some embodiments, a complementary effect may be applied to the highlight of the current presentation position (e.g., the highlighting of the current presentation position may fade out as the highlighting of the target fades in). As another example, an audible message or tone, such as a "beep," may be presented to the user to indicate the pending change in modification. As a further example, a tactile notification, such as a vibration of the device 100, may be presented.

At time (C), the content presentation module 110 may initiate the modification to content presentation. In the present example, the content presentation module 110 may move the current presentation position of the audio content item to a position that corresponds to the text 522 at which the user's gaze 526 is (or recently was) directed.

Although the examples illustrated in FIGS. 5A and 5B include the application of highlights to text that corresponds to the current presentation position of the audio version of the content, the examples are illustrative only, and are not intended to be limiting. In some embodiments, no highlights may be displayed in the text, or a user may configure whether or not highlights are to be displayed.

FIG. 5C illustrates presentation of content in which highlights may not be constantly applied to text that corresponds to the current presentation position of audio content. For example, a user may implement a configuration setting that causes the content presentation module 110 to refrain from displaying highlights. However, the user's gaze 546 may, at time (A), be directed to a target 544 that is a substantial distance from the text that corresponds to the current presentation position of the audio, or the user's gaze 546 may be directed off the display of the user device 100 altogether. In such cases, the content presentation module 110 may apply highlights 542 at time (B) to the text that corresponds to the current presentation position of the audio content. In this way, the user 150 may more easily determine the location 552 within the text that corresponds to the current presentation position of the audio content when the user's gaze 556 is redirected to the display of the user device 100. The content presentation module 110 may then stop the temporary display of highlights at time (C) after passage of some period of time, or after the eye tracking module 108 determines that the user's gaze 546 is directed to a target 544 on or near the text that corresponds to the current presentation position of the audio content.

At decision block 614, the content presentation module 110, interaction module 116, or some other module or component can determine whether content presentation has stopped. If so, the process 600 can terminate at block 616. Otherwise, the user's gaze may continue to be monitored at block 606. Content presentation may be stopped by a user 150 (e.g., the user closes the application that manages the content presentation, or the user activates some option to stop content presentation), by reaching an ending point of the content being presented, or by some other means.

Gaze-Related Commands

Figure 7:
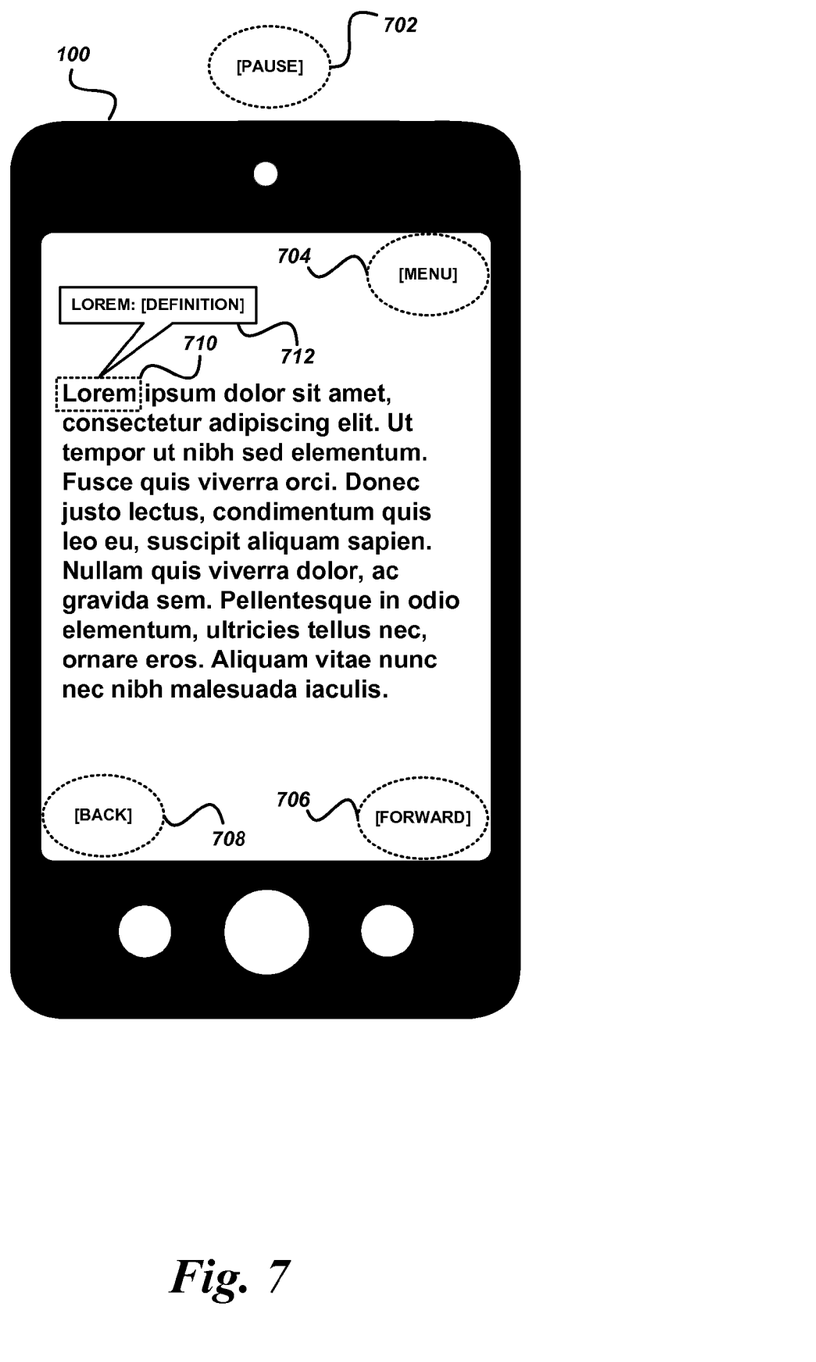
FIG. 7 is a diagram of illustrative gaze-based user interactions that may trigger a user computing device to perform various actions according to some embodiments.

FIG. 7 displays a user interface with various regions that correspond to different commands or actions to be performed by the user device 100. The examples described above relate to performing actions or modifying content presentation based on a determination of how far the target of a user's gaze deviates from the current presentation position. In contrast, the examples shown in FIG. 7 relate to performing actions in response to detecting that a user's gaze is directed towards various predetermined or dynamically determined locations. The eye tracking module 108, interaction module 116, or some other module or component may track the user's gaze and, in response to detecting that the user has looked at a specific point or region for a period of time exceeding some threshold (e.g., 2 seconds), a particular action can be performed.

As shown in FIG. 7 a user 150 may request or initiate a pause operation during content presentation by directing the user's gaze to a region 702 that is off of the display of the user device 100, such as a region 702 that is above the user device 100. A user 150 may access a menu of options by directing the user's gaze to another region 704. A user may request or initiate the display of text content to be advanced to the next page or returned to the previous page (and the presentation of audio content, if any, to be adjusted accordingly) by directing the user's gaze to other regions 706, 708. A user may request or initiate display of a definition 712 for a word by directing the user's gaze to the word 710 (e.g., the user may look at the word 710 for some period of time exceeding a threshold, such as 3 seconds). The example regions and responsive actions shown in FIG. 7 and described herein are illustrative only, and are not intended to be limiting. In some embodiments, fewer, additional, or alternative actions may be available for gaze-based initiation. For example: content presentation may be stopped, started, slowed, or sped up; text may be scrolled up or down; a web search may be initiated for a term at which the user's gaze is directed; a portion of text may be highlighted or an annotation may be inserted; etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as physical electronic hardware, or as a combination of computer software and physical electronic hardware. To clearly illustrate this interchangeability, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
  a data store configured to store computer-executable instructions; and
  a computing device in communication with the data store, the computing device, when executing the computer-executable instructions, configured to at least:
    cause presentation of an audio version of a content item and a textual version of the content item, wherein a current presentation position of the textual version is synchronized with a current presentation position of the audio version;
    receive, during presentation of the audio version and textual version of the content item, gaze tracking input regarding a gaze;
    determine, using the gaze tracking input, a target at which the gaze is directed;
    determine a distance from a current presentation position of the textual version of the content item to the target;
    determine a direction from the current presentation position of the textual version of the content item to the target;
    determine that the distance and direction correspond to a predetermined distance and direction from the textual version of the content item; and
    modify presentation of at least one of the audio version or textual version of the content item in response to the determination that the distance and direction correspond to the predetermined distance and direction from the textual version of the content item.

2. The system of claim 1, wherein the determination that the distance and direction correspond to the predetermined distance and direction from the textual version of the content item indicates that the direction is substantially vertical.

3. The system of claim 1, wherein the content item comprises a book, wherein the audio version comprises an audio book and the textual version comprises an electronic book.

4. The system of claim 1, wherein the computing device is configured to modify presentation by performing one of: advancing the current presentation position of the audio version of the content item to correspond to the target at which the gaze is directed; modifying a presentation speed of the audio version; or modifying a visual characteristic of a portion of the textual version corresponding to the current presentation position.

5. A computer-implemented method comprising:
under control of one or more computing devices configured with specific computer-executable instructions,
presenting, via a visual display component and an audio presentation component coupled to the one or more computing devices, content comprising an audio portion synchronized with a visual portion;
receiving, during presentation of the content, gaze tracking input regarding a gaze;
determining, using the gaze tracking input, a target at which the gaze is directed;
determining a distance from a current presentation position of the content to the target;
determining a direction from the current presentation position of the content to the target;
determining that the distance and direction correspond to a predetermined distance and direction from the visual portion; and
modifying presentation of the content in response to determining that the distance and direction correspond to the predetermined distance and direction from the visual portion.

6. The computer-implemented method of claim 5, wherein the current presentation position relates to a play position within the content, an elapsed time of the content, a remaining time of the content, a portion of the content, or an amount of the content.

7. The computer-implemented method of claim 5, wherein the content comprises a book, and wherein the audio portion comprises an audio book and the visual portion comprises an electronic book.

8. The computer-implemented method of claim 5, wherein determining that the distance and direction correspond to the predetermined distance and direction from the visual portion indicates that the direction is substantially vertical.

9. The computer-implemented method of claim 5, wherein modifying the presentation of the content comprises modifying the current presentation position of the content to correspond to the target of the gaze.

10. The computer-implemented method of claim 5, further comprising presenting, prior to modifying presentation of the content, an indication that presentation of the content will be modified.

11. The computer-implemented method of claim 10, wherein the indication comprises a visual indicator that dynamically reflects an amount of time before presentation of the content will be modified.

12. The computer-implemented method of claim 5, further comprising:
determining a characteristic of deviation of the target of the gaze from the current presentation of the content; and
identifying a presentation modification of a plurality of presentation modifications based at least partly on the characteristic of deviation.

13. The computer-implemented method of claim 5, wherein the gaze tracking input comprises input obtained from a user-facing camera.

14. The computer-implemented method of claim 5, further comprising performing an operation in response to determining that the gaze is directed to a predetermined region of a display.

15. A non-transitory computer storage medium which stores a computer-executable module, said computer-executable module, when executed by one or more processors, being configured to:
receive, during presentation of a content item comprising an audio portion synchronized with a visual portion, gaze tracking input regarding a gaze;
determine, using the gaze tracking input, a target at which the gaze is directed;
determine a distance from a current presentation position of the content item to the target;
determine a direction from the current presentation position of the content item to the target;
determine that the distance and direction correspond to a predetermined distance and direction from the visual portion; and
modify presentation of the content item in response to determining that the distance and direction correspond to the predetermined distance and direction from the visual portion.

16. The non-transitory computer storage medium of claim 15, wherein the computer-executable module is further configured to determine whether to modify presentation of the content item based at least partly on a characteristic of the visual portion currently presented.

17. The non-transitory computer storage medium of claim 15, wherein the current presentation position relates to a play position within the content item, an elapsed time of the content item, a remaining time of the content item, a portion of the content item, or an amount of the content item.

18. The non-transitory computer storage medium of claim 15, wherein the content item comprises a book, and wherein the audio portion comprises an audio book and the visual portion comprises an electronic book.

19. The non-transitory computer storage medium of claim 15, wherein determining that the distance and direction correspond to the predetermined distance and direction from the visual portion indicates that the direction is substantially vertical.

20. The non-transitory computer storage medium of claim 15, wherein modifying presentation of the content item comprises modifying the current presentation position of the content item to correspond to the target of the gaze.

21. The non-transitory computer storage medium of claim 15, wherein the computer-executable module is further configured to:
determine an amount of deviation of the target of the gaze from the current presentation of the content item; and
identify a presentation modification of a plurality of presentation modifications based at least partly on the amount of deviation.

22. The non-transitory computer storage medium of claim 15, wherein the gaze tracking input comprises optical input obtained from a user-facing camera.

23. The non-transitory computer storage medium of claim 15, wherein the computer-executable module is further configured to perform an operation in response to determining that the gaze is directed to a predetermined region of a display.

* * * * *